March 19, 1963
R. L. REED
3,081,900
CLOSURE DEVICE
Filed Sept. 20, 1960
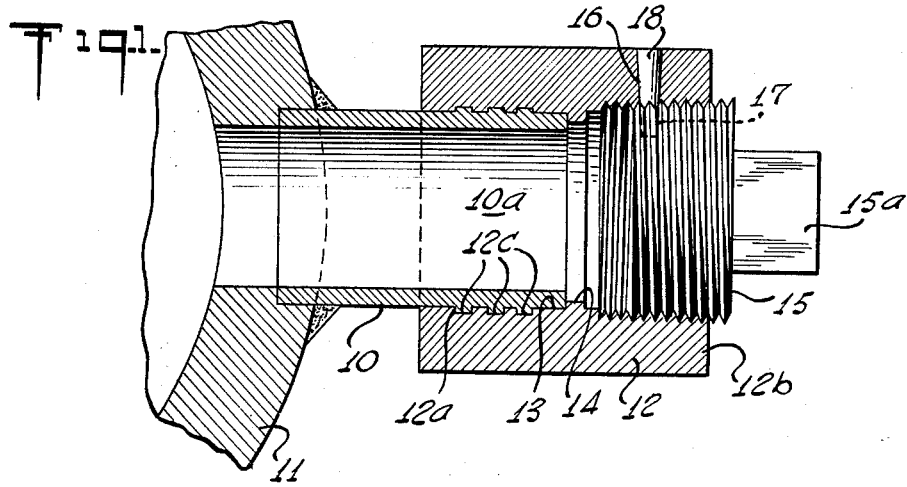
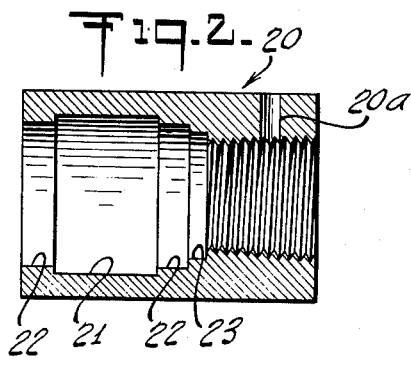 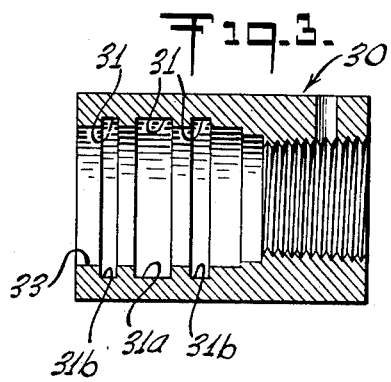
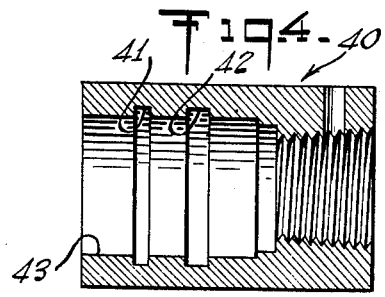
INVENTOR
Roland L. Reed
BY
ATTORNEY

United States Patent Office 3,081,900
Patented Mar. 19, 1963

3,081,900
CLOSURE DEVICE
Roland L. Reed, Paris, Tex., assignor to The Babcock & Wilcox Company, New York, N.Y., a corporation of New Jersey
Filed Sept. 20, 1960, Ser. No. 57,267
4 Claims. (Cl. 220—39)

This invention relates to an improved closure device and more particularly to a plug type closure for sealing the end of a tube or tube stub or the like in a pressure operated fluid heating apparatus.

In the operation of a steam generating unit it is oftentimes desirable and at times necessary to plug or seal off one or more of the tubes or tube stubs to prevent the flow of fluid therethrough. The sealing of such tubes may arise either from a design consideration requiring a reduction in the amount of heating surface, or from some mechanical defect such as tube rupture. In any event, it is essential that the sealing off of the appropriate tube or tube stub be done quickly, simply and effectively, so that the unit may be returned to operation without an extensive delay.

Heretofore, whenever it was required to temporarily seal off a tube or tube stub for any reason, it has been customary to seal the tube from within the header by driving a tapered plug into the inner end of the tube, access to the tube being had through an oppositely disposed handhole provided for this purpose. However, use of such tapered plugs has not been proven to be entirely satisfactory, since such internally installed plugs are both difficult to install or remove without incurring damage to the tube or the wall of the pressure vessel in which the tube is expanded. Further, if the tube end is slightly out of round, the use of internally tapered plugs will not function as an effective fluid-tight seal. Experience has further shown that a considerable amount of difficulty has been encountered in resealing the handholes provided for such access due to leakage and/or damage to the handhole fittings and/or adjacent header facings.

An object of this invention is to provide an improved plug type closure assembly for sealing an end of the tube or tube stub which can be readily installed and removed from the outer end of a tube and which does not require any welding operation.

Another object of the invention is to provide a plug closure which positively resists the internal pressures acting within the tube and tending to expel the closure therefrom.

The foregoing objects and other allied features and advantages are attained in accordance with this invention by an improved closure device which comprises essentially a sleeve adapted to receive the end of the tube or tube stub to be sealed. Acordingly, the sleeve is provided with an inwardly extending shoulder disposed intermediate the length of the sleeve against which the tube end is adapted to abut in the assembled position. The portion or bore of the sleeve receiving the tube end is provided with a relatively smooth inner surface in which there is formed one or more annular grooves into which the tube end is expanded to firmly secure the tube and sleeve in fluid-tight relationship. The portion of the sleeve extending beyond the shoulder and the end of the tube is internally threaded for receiving the threaded closure plug to seal the tube end. If desired, the threaded portion of the sleeve is provided with a radially drilled hole to serve as a guide for drilling the plug and through which a lock pin is inserted to firmly secure and lock the plug within the sleeve.

A feature of this invention resides in the provision that the plug renders it possible to seal an opening of a pressure vessel or tube stub from the exterior side thereof.

Another feature of the invention is that the improved closure is simple to install, positive in operation, and readily removable without damage to the tube.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

In the drawings:

FIG. 1 is a sectional side view of the improved closure illustrated in the assembled, tube sealing position.

FIGS. 2 to 4 illustrate various modified forms of the closure sleeve in accordance with this invention.

Referring to FIG. 1, a tube 10 is shown as it is customarily installed in a curved wall of a pressure vessel 11, as for example, a drum or header of an economizer or superheater and the like, as generally employed in a steam generating unit. Oftentimes in such units it is desirable or necessary to seal off the fluid flow through any one of the connected tubes, as for example, when a tube develops a rupture anywhere along the length thereof. As it is oftentimes difficult, if not impossible, to gain access to the inner end of the tube opening into the header, it becomes necessary or highly desirable to seal the tube from the outside of the header. This is particularly true of generating units operating on board ship where it is desirable to weld over the handholes, which are generally provided for access in sealing ruptured tubes from the inside of the header.

According to this invention, in the event a tube is required to be sealed off, as for example, in case of a tube rupture, the ruptured tube is first cut at a position, preferably slightly beyond the outer surface of the drum or header, to form a tube stub 10. The stub 10 is then sealed off from the outside of the header as will be herein described.

Referring to FIG. 1, the closure assembly for sealing off the stub 10 comprises a tubular sleeve 12 opened at each end. One end 12a of the sleeve is provided with a bore 13 proportioned to receive the outer end 10a of the tube stub 10. An internal, inwardly extending shoulder 14 is formed intermediate the length of the sleeve to define the inner extremity of bore 13 and which in the assembled position forms an abutment against which the end of the tube stub rests.

According to this invention, the sleeve 12 is firmly secured to the tube stub 10 in fluid-tight relationship by an expanding operation wherein the tube stub is expanded into the sleeve. This is readily accomplished by means of a suitable expanding tool which is inserted through the outer end of the sleeve. One or more circumferentially extending, longitudinally spaced grooves 12c are formed in the surface of the bore to enhance the holding bond between the sleeve and tube stub.

As shown, the portion 12b of the sleeve 12 extending beyond the internal shoulder 14 and beyond the end 10a of the tube 10 is internally threaded to receive a threaded plug 15. Preferably the threaded portion 12b tapers inwardly and the plug 15 recessible therein is tapered accordingly. Projecting beyond the end of the plug 15 is a rectangular or polygonal boss 15a for accommodating a suitable wrench to facilitate threading of the plug into the sleeve to seal the end thereof.

If desired, a radially extending hole 16 is provided in the threaded portion 12b of the sleeve 12. This hole 16 is provided to function as a guide for drilling a complementary hole 17 into the plug, when in the assembled position, so that a lock pin 18 may be inserted through the hole 16 and the aligned drilled hole 17 of the plug to firmly secure and lock the plug to the sleeve.

In FIG. 1, the bore 13 of the sleeve 12 is illustrated as having three grooves 12c substantially equal in width and substantially equidistantly spaced along the longitudinal axis of the sleeve.

The sleeve 20 illustrated in FIG. 2 is substantially similar in all respects to the sleeve described with respect to FIG. 1, with the exception that a single annular groove 21 is provided in bore 22 of sleeve 20. As shown, the single groove 21 occupies a major portion of the axial length of bore 22. In this form shoulder 23 separates the bore 22 of the sleeve 20 from its outer threaded portion 20a.

In FIG. 3, sleeve 30 is similar in all respects as described with reference to FIGS. 1 and 2, with the exception that the annular grooves 31 provided in bore 33 are not rendered uniform in width. In this form a relatively wide groove 31a is positioned between a pair of relatively narrower grooves 31b.

FIG. 4 illustrates still a further modification of a sleeve. As shown, sleeve 40 is similar to the sleeve 12 hereinbefore described with the exception that only two spaced grooves 41, 42 are provided in the inner surface of bore 43. Thus the holding power which is required to be incorporated in any given sleeve can be readily varied by altering the number and size of holding grooves. Further, for greatest holding power the tube should be expanded hardest over the grooved portion of its respective sleeve, and need not be expanded to as great an extent near the outer end.

From the foregoing it will be noted that the plug closure described can be readily installed in the field with a minimum of effort and skill. Micrometer tolerances also are not involved, and as a result tube butt reaming and its attendant problems is not required either.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A tube end closure comprising a tubular sleeve having an internal, inwardly extending shoulder disposed intermediate the ends of said sleeve, said sleeve having a plurality of internal circumscribing grooves spaced along the longitudinal axis of said sleeve on one side of said shoulder adapted to engage with projections on the external surface of the tube to be closed formed by plastically expanding said tube within said sleeve to provide a binding pressure-tight connection therebetween, a tapered internally threaded portion on the other side of said shoulder, and a tapered plug adapted to be threaded into said threaded portion.

2. A pressure-tight tube closure comprising a tubular sleeve having one end portion adapted to enclose and engage one end of a tube and an opposite end portion formed with internal threads and an intermediate portion having its inner surface formed with a shoulder adapted to engage the end of said tube, said one end portion of the sleeve being formed with a circumferentially extending groove adapted to interlock with a corresponding projection on the external surface of said tube formed by plastically expanding said tube to provide an unyielding connection between said tube and said sleeve, and a plug arranged to be threaded into said opposite end portion of said sleeve.

3. A pressure-tight tube closure comprising a tubular sleeve having one end portion adapted to enclose and engage one end of a tube and an opposite end portion formed with internal threads and an intermediate portion having its inner surface formed with an inwardly projecting shoulder adapted to engage the end of said tube and having a diameter less than the external diameter of said tube, said one end portion of the sleeve being formed with a circumferentially extending groove having a substantially rectangular cross section and adapted to interlock with a corresponding projection on the external surface of said tube formed by plastically expanding said tube to provide an unyielding connection between said tube and said sleeve, and a threaded plug arranged to be threaded into said opposite end portion of said tube.

4. A pressure-tight tube closure comprising a metallic tubular sleeve having one end portion adapted to enclose and engage one end of a tube and an opposite end portion formed with internal threads and an intermediate portion having its inner surface formed with an inwardly projecting shoulder adapted to engage the end of said tube and having a diameter less than the external diameter of said tube, said one end portion of the sleeve being formed with a plurality of circumferentially extending grooves adapted to interlock with corresponding projections on the external surface of said tube formed by plastically expanding said tube to provide an unyielding connection between said tube and said sleeve, and a threaded plug arranged to be threaded into said opposite end portion of said tube.

References Cited in the file of this patent

UNITED STATES PATENTS

| | | |
|---|---|---|
| 1,191,503 | Ford | July 18, 1916 |
| 1,595,186 | Gray | Aug. 10, 1926 |
| 2,487,939 | Norton | Nov. 15, 1949 |
| 2,722,238 | Stuvel | Nov. 1, 1955 |
| 2,754,577 | Maxwell | July 17, 1956 |